(12) United States Patent
Hayami

(10) Patent No.: US 6,634,773 B2
(45) Date of Patent: Oct. 21, 2003

(54) VEHICLE LIGHTING APPARATUS

(75) Inventor: Toshihisa Hayami, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/137,018

(22) Filed: May 1, 2002

(65) Prior Publication Data
US 2002/0163816 A1 Nov. 7, 2002

(30) Foreign Application Priority Data
May 7, 2001 (JP) .................... P2001-135899

(51) Int. Cl.⁷ .................... F21W 101/10
(52) U.S. Cl. .................... 362/464; 362/514; 362/465; 362/466
(58) Field of Search .................... 362/40, 41, 42, 362/464, 465, 466, 514

(56) References Cited

U.S. PATENT DOCUMENTS

| | | | |
|---|---|---|---|
| 4,663,696 A | 5/1987 | Miyazawa et al. | 362/80 |
| 4,733,333 A | 3/1988 | Shibata et al. | 362/40 |
| 5,588,733 A * | 12/1996 | Gotou | 362/37 |
| 5,907,196 A * | 5/1999 | Hayami et al. | 362/466 |
| 6,049,749 A * | 4/2000 | Kobayashi | 362/466 |
| 6,193,398 B1 * | 2/2001 | Okuchi et al. | 362/466 |
| 6,343,869 B1 * | 2/2002 | Kobayashi | 362/37 |
| 6,443,603 B1 * | 9/2002 | Eberhardt | 362/465 |
| 6,547,424 B2 * | 4/2003 | Hasumi et al. | 362/465 |

FOREIGN PATENT DOCUMENTS

| | | |
|---|---|---|
| DE | 197 17 575 A1 | 11/1997 |
| DE | 197 56 574 A1 | 10/1998 |
| DE | 199 14 526 A1 | 10/1999 |
| DE | 199 50 504 A1 | 5/2001 |

OTHER PUBLICATIONS

English abstract of DE 199 14 526.*

* cited by examiner

Primary Examiner—Laura K. Tso
(74) Attorney, Agent, or Firm—Fish & Richardson P.C.

(57) ABSTRACT

An adaptive front-lighting system includes a lamp deflection angle controlling means for controlling a deflection angle of an auxiliary lamp that is attached to a main lamp corresponding to a traveling state of a vehicle. The system is provided with vehicle halting state detecting means for detecting a halted state in which the vehicle is halted or traveling at a very low speed, and illumination controlling means for turning off or dimming an auxiliary lamp when the halted state is continued for more than a prescribed time period. When the vehicle is halted with the auxiliary lamp deflected, and the halted state is continued for more than the prescribed time period, the auxiliary lamp is turned off or dimmed, and thus other cars and pedestrians are prevented from being dazzled by the auxiliary lamp, and the trailing car may be prevented from having a sense of insecurity.

4 Claims, 10 Drawing Sheets

VEHICLE LIGHTING APPARATUS

BACKGROUND OF THE INVENTION

1. Field of the Invention

The present invention relates to a lighting apparatus for vehicles such as motor vehicles, and more specifically, to a vehicle lighting apparatus comprising lamp deflection angle controlling means for controlling the changes in direction of beam of the lamp corresponding to the traveling conditions, for example, an adaptive front-lighting system (hereinafter referred to as AFS). More specifically, the present invention to a vehicle lighting apparatus ensuring traffic safety with the vehicle halted.

2. Description of the Related Art

Figure 1:
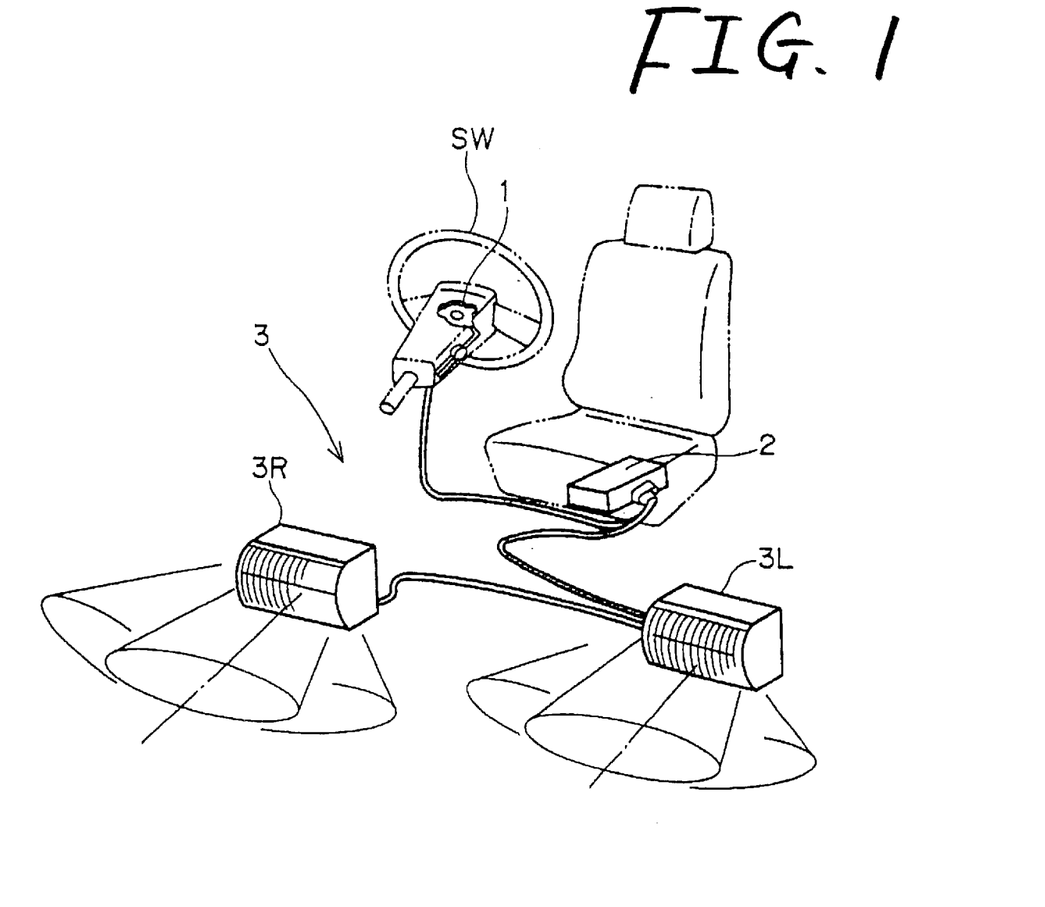
FIG. 1 is a drawing showing the conceptual construction of the AFS.

The AFS proposed for enhancing driving safety of motor vehicles detects information on the steering angle of the steering wheel SW of the motor vehicles, the vehicle speed, and other traveling conditions of the motor vehicles by the sensor 1, and outputs the detected output to the electronic control unit 2 (hereinafter referred to as ECU) as shown in FIG. 1. The ECU 2 controls the swivel type lights 3R, 3L provided respectively on the left and right of the front portion of the motor vehicle, that is, the headlamps 3 that the direction of radiation can be deflected in the lateral direction based on the supplied sensor outputs. Such swivel type lights 3R, 3L may include, as a structure that can turn the reflector provided in the headlamp in the horizontal direction, a structure that can turn the reflector by the driving source such as a motor or the like. A mechanism for this turning is referred to as an actuator in this specification. According to the AFS in this type, by detecting the steering angle of the steering wheel or the lighting condition of the turn signal lamps while the vehicle is traveling on the curved road, and controlling the deflection of the direction of radiation of the swivel type light, the portion of the road ahead of the curve can be illuminated corresponding to the traveling speed of the motor vehicle, thereby being effective in improvement of driving safety.

However, when the vehicle provided with the AFS is stopped with the steering wheel steered, or with the turn signal lamp turned on, or when traveling at very low speeds not more than 5 km/h, which is almost in the state of coming to stop (hereinafter, both of the halted state and the traveling state at very low speeds are referred to as halted state in this specification.), the direction of radiation of the swivel type light is maintained in the deflected state while the vehicle is in the halted state. Therefore, the light is irradiated from the swivel type light continuously in a specific direction, that is, in the deflected direction while the vehicle is in the halted state, which may cause the unfavorable conditions in terms of traffic safety. For example, when the vehicle is stopped on the road shoulder along the sidewalk, the light from the swivel type light may dazzle the oncoming cars or the pedestrians, or the traffic lane being next to the road shoulder is illuminated, which gives the fear of insecurity to the trailing car that the car on the road shoulder may come into the traffic lane. In this way, keeping the swivel type light on in the halted state causes traffic safety problems for pedestrians or other cars. In this case, it is conceivable that the swivel type light is turned off when in the halted state, but only by turning off the lamp, if the swivel type light is turned off in the case where the vehicle is halted until the oncoming cars are discontinued with the steering wheel steered before turning to the right, the traffic safety problems for the oncoming cars may arise.

SUMMARY OF THE INVENTION

The object of the present invention is to provide a vehicle lighting apparatus in which dazzling of other cars or pedestrians due to the AFS is prevented and traffic safety is ensured.

According to the present invention, there is provided a vehicle lighting apparatus comprising lamp deflection angle controlling means for controlling the changes of the deflection angle of the auxiliary lamp attached to the main lamp and controlling the deflection angle of the auxiliary lamp corresponding to the traveling condition of the vehicle, further comprising vehicle halted state detecting means for detecting the halted state of the vehicle, and illumination controlling means for turning off or dimming the auxiliary lamp when the halted state of the vehicle is continued for more than the prescribed time period. Here, the illumination controlling means is adapted to turn the auxiliary lamp again at the same brightness as before it is turned off or before dimmed when the vehicle came out of the halted state. The lamp deflection angle controlling means is preferably adapted to continue the deflecting operation of the auxiliary lamp as long as the halted state of the vehicle is continued.

According to the present invention, when the vehicle is in the halted state including the halted state or the state of traveling at very low speed with the auxiliary lamp of the vehicle deflected and such halted state is continued for a prescribed time period, the auxiliary lamp is turned off or dimmed. Therefore, other cars or pedestrians are prevented from being dazzled by the auxiliary lamp, or the trailing cars are prevented from having a feeling of insecurity, and on the other hand, the illumination of the auxiliary lamp may be maintained when turning to the right or the like, thereby ensuring traffic safety. In addition, when the vehicle starts to travel and thus came out of the halted state, the auxiliary lamp is illuminated at the same brightness as before it is turned off or before dimmed, and since the deflecting operation of the auxiliary lamp is continuously made while the vehicle is in the halted state, traffic safety can be enhanced by the auxiliary lamp when the vehicle starts to travel again.

DETAILED DESCRIPTION OF THE PREFERRED EMBODIMENTS

Figure 2:
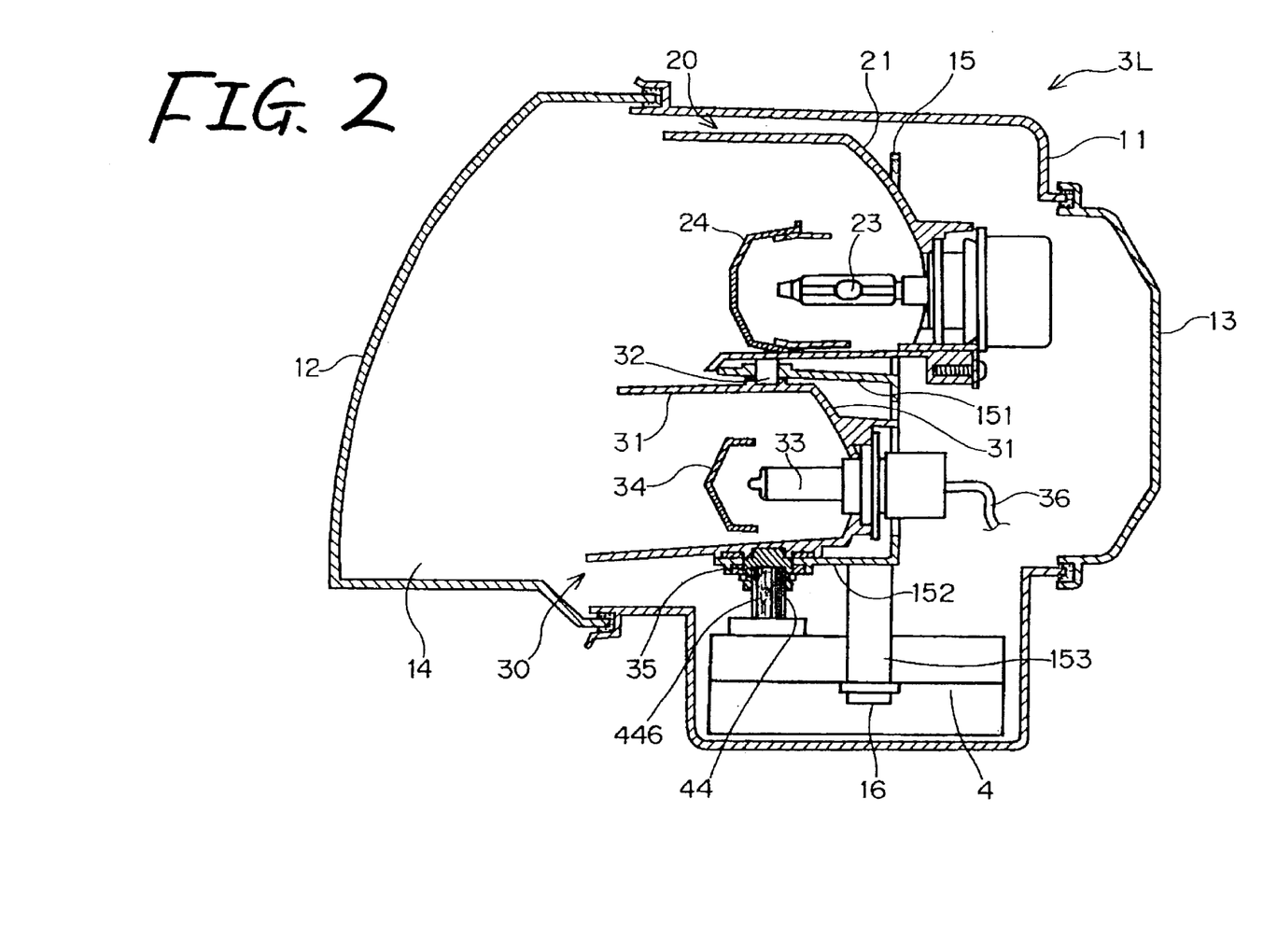
FIG. 2 is a vertical cross section of the swivel lamp.
Figure 3:
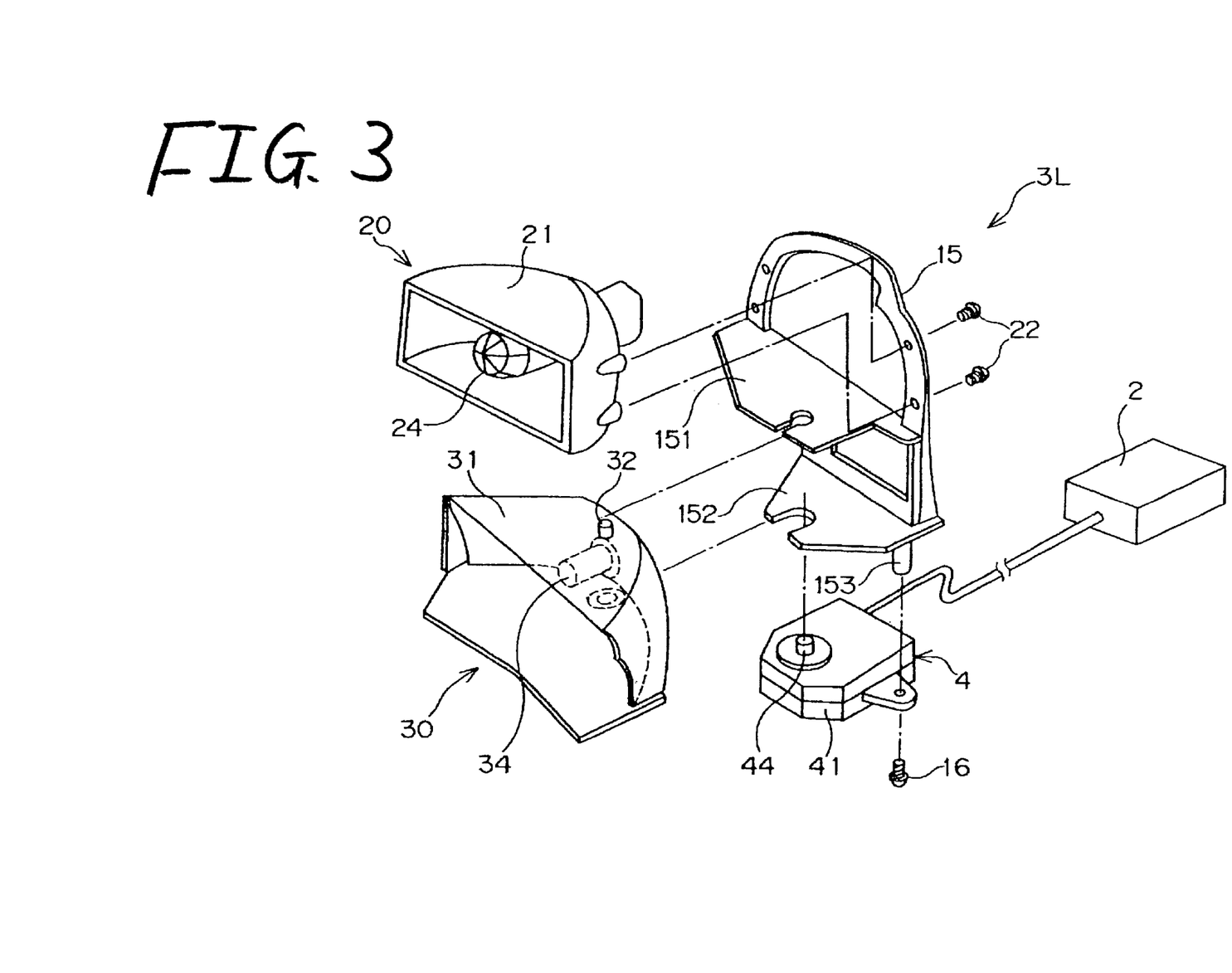
FIG. 3 is an exploded perspective view of the internal construction of the swivel lamp.

Referring now to the drawings, an embodiment of the present invention will be described. FIG. 2 is a vertical cross section of the left lamp 3L of the headlamps constructed of swivel type lights of which the direction of radiation is deflectable toward the left and the right out of the components of the AFS as lamp deflection angle controlling means according to the present invention shown in FIG. 1, FIG. 3 is a partially exploded perspective view of the internal construction thereof. The lamp body 11 is provided with a lens 12 at the front opening thereof and a cover 13 at the rear opening thereof to define a lamp chamber 14, and the lamp chamber 14 is provided with a fixed bracket 15 in the shape of a shelf having an upper plate 151 and the lower plate 152 therein. The fixed bracket 15 is provided with a fixed reflector 21 mounted at the upper portion thereof, and a swivel reflector 31 supported at the lower portion thereof. The fixed reflector 21 is fixed on the upper plate 151 of the fixed bracket 15 by means of a screw 22, and a discharge bulb 23 is mounted in the fixed reflector 21 together with a shade 24, so as to be constructed as a fixed lamp 20 (main lamp) having a prescribed luminous intensity distribution characteristic toward the front of the motor vehicle. The swivel reflector 31 is interposed between the upper plate 151 and the lower plate 152 of the fixed bracket 15, and fitted and supported so as to be capable of rotating in the horizontal direction about a supporting shaft 32 projected from the upper surface of the swivel reflector 31, and is provided therein with a halogen bulb 33 mounted together with a shade 34. An actuator 4 driven by the ECU 2 shown in FIG. 1 is fixed and supported on the lower side of the lower plate 152 of the fixed bracket 15 in the lamp chamber 14, and a stem 153 provided on the fixed bracket 15 is fixed on a part of the actuator 4 by means of a screw 16. The revolving output shaft 44 of the actuator 4 is connected to the bearing portion 35 provided on the lower surface of the swivel reflector 31 at the coaxial position with the supporting shaft 32, so that the swivel reflector 31 is driven and rotated by a rotational driving force of the revolving output shaft 44, and constructs a swivel lamp 30 (auxiliary lamp) of which the direction of radiation can be deflected toward the left and the right.

Figure 4:
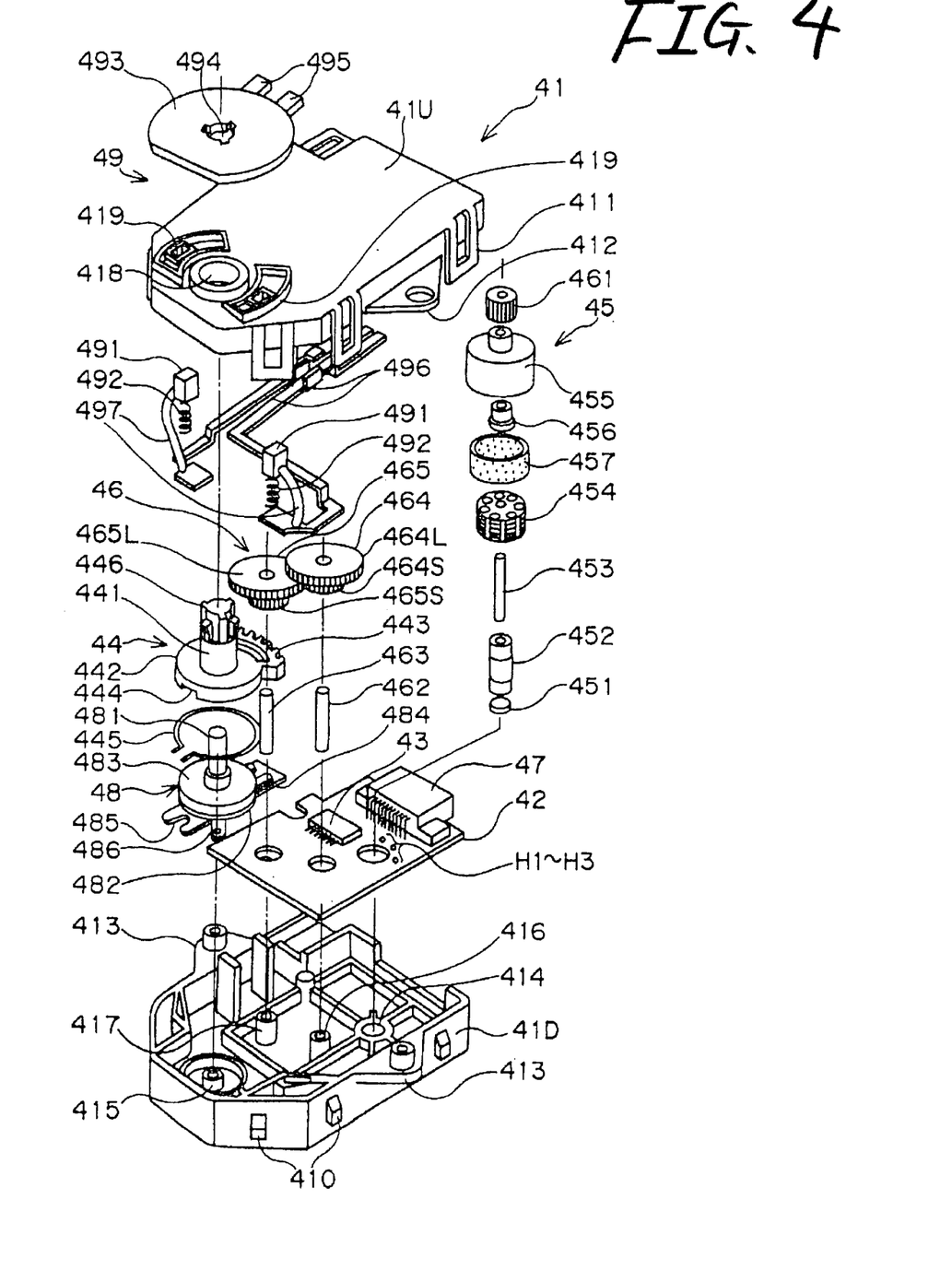
FIG. 4 is a partial exploded perspective view of the actuator.
Figure 5:
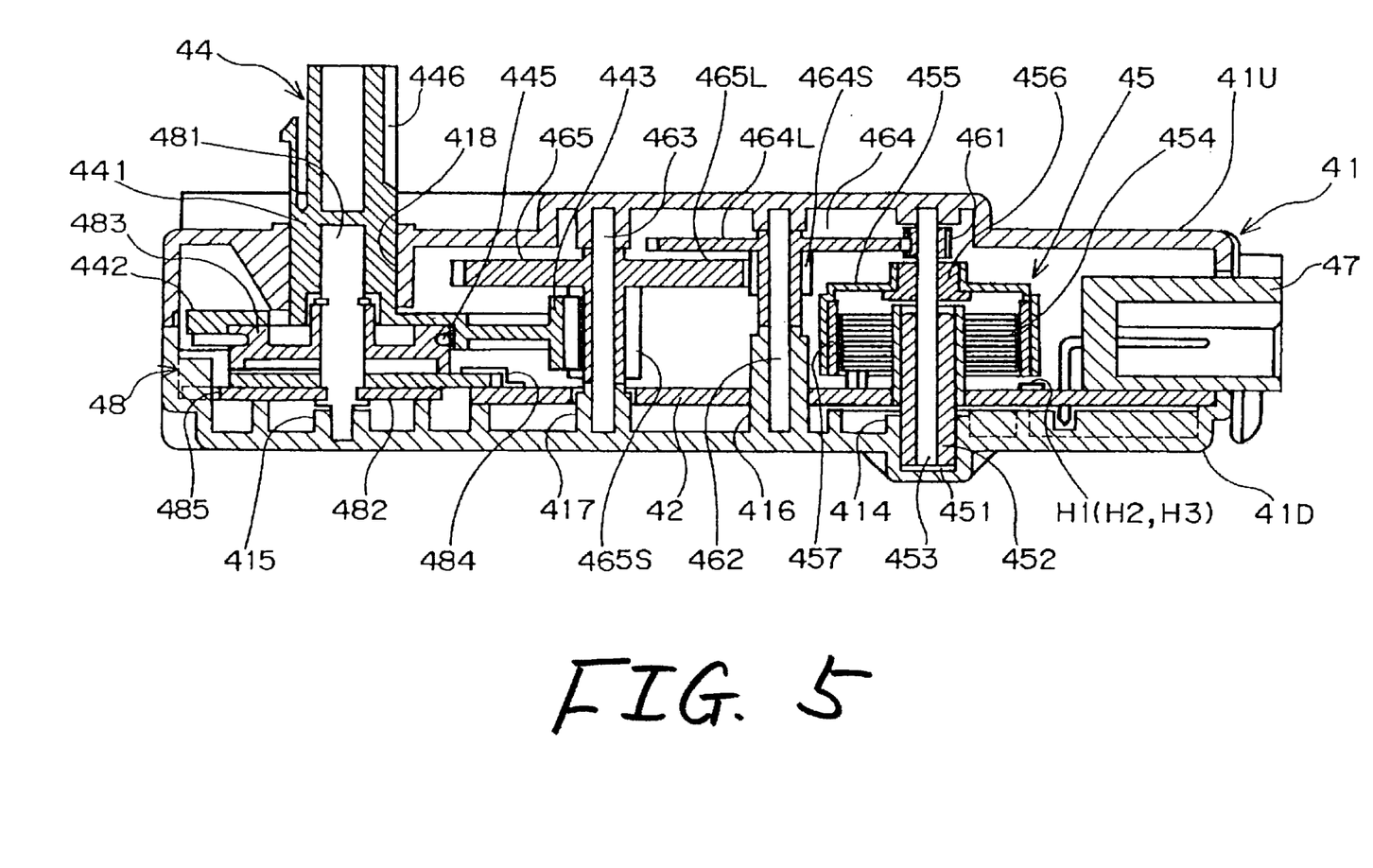
FIG. 5 is a vertical cross section of the actuator.

FIG. 4 is an exploded perspective view of the principal portion of the actuator 4, and FIG. 5 is a vertical cross section in its assembled state. The case 41 comprises a lower half 41D and the upper half 41U, and the projection 410 on the lower half 41D and the fitting strip 411 of the upper half 41U are fitted with respect each other. The upper half 41U and the lower half 41D are formed with the supporting strips 412, 413 projecting therefrom for supporting the fixed bracket 15 toward both sides respectively. The case 41 contains a printed board 42 having an electronic part 43 as a control circuit that will be described later, the revolving output shaft 44 for directly rotating the swivel reflector 31, a brushless motor 45 as a driving source for rotating the revolving output shaft 44, and a speed reducing gear mechanism 46 for transmitting a rotational force of the brushless motor 45 to the revolving output shaft 44 mounted thereon. The revolving output shaft 44 is provided with a potentiometer 48 as lamp deflecting angle detecting means disposed coaxially therewith. The printed board 42 is provided with a connector 47 to which the vehicle-mounted power cable, not shown, is connected for supplying electric power to the brushless motor 45 and the halogen lamp 33 of the swivel lamp 30 respectively. The upper half 41U is provided with a movable contact mechanism 49 for electrically connecting the actuator 4 and the cable 36 of the halogen lamp 33 on the upper surface thereof.

Figure 6:
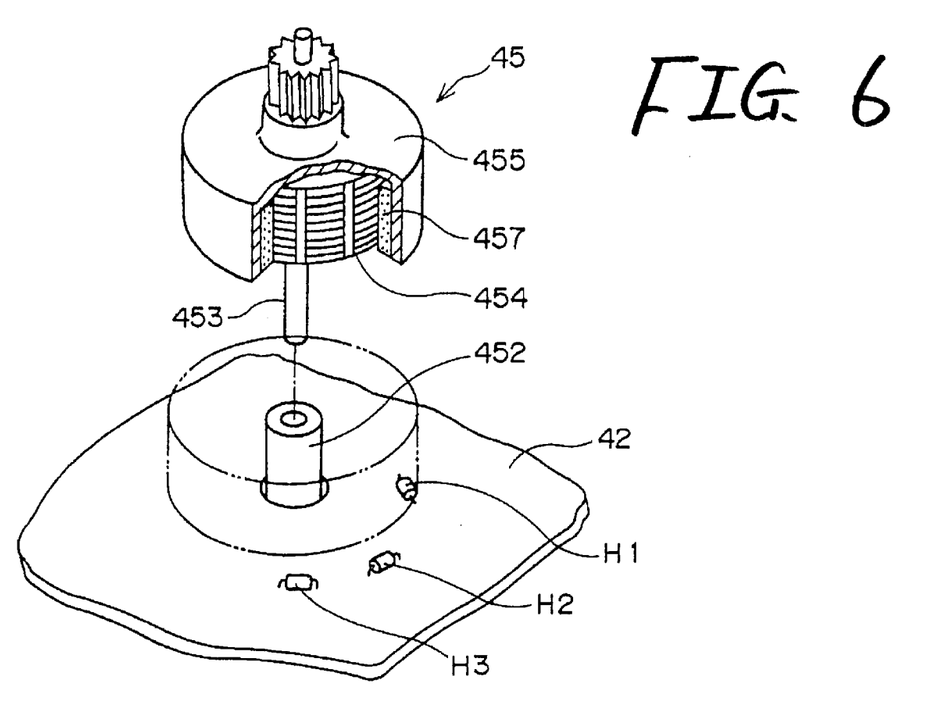
FIG. 6 is a partially enlarged perspective view of a brushless motor.

The brushless motor 45 comprises, as shown in FIG. 6 as a partially broken perspective view, a revolving shaft 453 supported in the boss hole 414 of the lower half 41D by means of a thrust bearing 451 and the bearing sleeve 452 so as to be capable of torsional rotation, a stator coil 454 fixed and supported on the printed board 42 around the revolving shaft 453, and a rotor 455 formed in the shape of a cylindrical container fixed to the revolving shaft 453 and mounted so as to cover the stator coil 454. The rotor 455 is fixed to the revolving shaft 453 by the rotor boss 456, and provided with a cylindrical rotor magnet 457 integrally on the inner surface thereof. The stator coil 454 comprises three pairs of coils equally distributed in the circumferential direction, and each pair of coils is fed with power via the printed wiring of the printed board 42, not shown, and magnetized into S-pole and N-pole alternately in the circumferential direction by such power feeding. The rotor magnet 457 is magnetized into S-pole and N-pole alternately in the circumferential direction corresponding to the stator coil 454. In the brushless motor 45, by supplying alternate current having different phases, that is, three phase current with respect to three coils of the stator coil 454, the rotor magnet 457, that is, the rotor 455 and the revolving shaft 453 are driven to rotate. In addition, as shown in FIG. 6, a plurality of, in this case, three hall elements H1, H2, H3 are disposed and supported on the printed board 42 at required intervals along the circumferential direction of the rotor 455, so that the magnetic field in each hall element H1, H2, H3 is changed when the rotor magnet 457 is rotated along with the rotor 455, and the state of each hall elements H1, H2, H3 is changed between ON and OFF to supply pulse signal corresponding to the cycle of rotation of the rotor 455.

The potentiometer 48 is provided with a fixed substrate 482 fixed on the fixed shaft 481 passing through the printed board 42 and standing upright in the boss hole 415 of the lower half 41D, and having a resistance pattern, not shown, formed on the surface thereof, and a rotary disc 483 rotatably supported on the fixed shaft 481 so as to face toward the fixed substrate 482 in the axial direction, and having a sliding contact point, not shown, for sliding on the surface of the resistance pattern. The fixed substrate 482 is prevented from rotating with respect to the lower half 41D by engaging the engaging projection 485 provided on a part of the circumference with a part of the inner wall of the lower half 41D. The rotary disc 483 is formed with an adjusting strip 486 projected from a part of the circumference thereof. This potentiometer 48 is constructed in such a manner that a rotary motion of the rotary disc 483 varies the sliding position of the sliding contact point on the surface of the resistance pattern, which in turn varies the resistance value of the resistance pattern provided on the fixed substrate 482, and the resistance value is supplied from the electrode terminal 484 on the fixed substrate 482 as the rotational position of the revolving output shaft, or as the deflection angle detected signal of the swivel reflector 31.

The revolving output shaft 44 is adapted to be connected with the rotary disc 483 of the potentiometer 48 via a clutch, and comprises a hollow shaft 441 covered on the fixed shaft 481 of the potentiometer 48 so as to be capable of torsional rotation, a clutch cylinder 442 in the shape of a short cylinder integrally provided at the lower end portion of the hollow shaft 441, and a sector gear 443 formed integrally along a part of the outer periphery of the clutch cylinder 442. The clutch cylinder 442 is disposed so as to cover the rotary disc 483 and provided at a part of the circumference thereof with a notch 444. A clutch spring 445 formed by bending the spring wire material into a substantially circular shape and being resiliently attached on the peripheral surface of the rotary disc is engaged with the notch 444 at both ends, whereby the clutch cylinder 442 is connected to the rotary disc 483 via the clutch spring 445 so as to be frictional in the direction of rotation. Therefore, by rotating the revolving output shaft 44, or the clutch cylinder 442, by manual operation in a state in which rotation of the rotary disc 483 is locked by holding the adjusting strip 486 projected from a part of the circumference of the rotary disc 483 with a jig or the like, relative position between the potentiometer 48 and the revolving output shaft 44 in the direction of rotation can be adjusted by rotating the revolving output shaft 44 in a sliding motion with respect to the rotary disc 483 by the frictional connection of the clutch spring 445. The relative position adjustment is utilized for zero adjustment of the output from the potentiometer 48.

The speed reducing gear mechanism 46 is provide in the region between the brushless motor 45 and the sector gear 443 of the potentiometer 48. The speed reducing gear mechanism 46 comprises a drive gear 461 mounted on the revolving shaft 453 of the brushless motor 45 and a first gear 464 and a second gear 465 rotatably supported respectively on two fixed shafts 462, 463 passing through the printed board 42 and standing upright at a required interval in the boss holes 416, 417 of the lower half 41D. The first gear 464 and the second gear 465 comprises integrally formed larger gears 464L, 465L and smaller gears 464S, 465S respectively. The drive gear 461 engages the larger gear 464L of the first gear 464, and the smaller gear 464S of the first gear 464 engages the larger gear 465L of the second gear 465, and then the smaller gear 465S of the second gear 465 engages the sector gear 443. Accordingly, a rotational force of the brushless motor 45 is reduced by the speed reducing gear mechanism 46 and transmitted to the sector gear 443, so that the revolving output shaft 44 is rotated at a reduced speed. The upper end portion of the revolving output shaft 44 is formed as a spline shaft 446 and passed through the output shaft hole 418 formed on the upper half 41U and projected from the upper surface of the case 41, so as to be fitted in the spline groove on the bearing portion 35 provided on the lower surface of the swivel reflector 31 to allow the swivel reflector 31 to rotate integrally by a rotational force of the revolving output shaft 44.

The movable contact point mechanism 49 disposed on the upper surface of the upper half 41U comprises a pair of contact point brushes 491 contained in the case 41, partially exposed part of them through a pair of rectangular holes 419 formed on the upper surface on a circumference and urged into the projecting direction by the springs 492, and a contact plate 493 having a spline shaft hole 494 for fitting the spline shaft 446 of the revolving output shaft 44 therein so as to be rotated integrally with the revolving output shaft 44 in the direction of rotation in the region above the contact point brushes 491. The contact point plate 493 is provided on the lower surface thereof with a pair of contact point strips (not shown) extending therefrom for sliding contact with the contact point brushes 491, so as to be capable of rotating together with the revolving output shaft 44 in a state in which the electrical contact with the contact point brushes 491 is maintained. The contact point plate 493 is provided with an electrode terminal 495 continuing to the contact point strip, and the electrode terminal 495 may be attached and detached with a connector, not shown, of the cable 36 connected to the halogen lamp 33 of the swivel lamp 30 shown in FIG. 2. The pair of contact point brushes 491 are connected to the ends of a pair of narrow conductive plates 496 extending respectively in the case 41 via the conductive wires 497, which in turn is electrically connected to the vehicle mounted power source, not shown, by a connector, not shown, to be connected to the other ends of the conductive plates 495. Accordingly, the movable contact point mechanism 49 electrically connects the halogen lamp 33 with the vehicle-mounted power source, and prevents the cable 36 for connecting the swivel lamp 30 and the actuator 4 from becoming kinked when the swivel reflector 31 of the swivel lamp 30 is moved, thereby ensuring smooth rotational movement of the swivel reflector 31.

Figure 7:
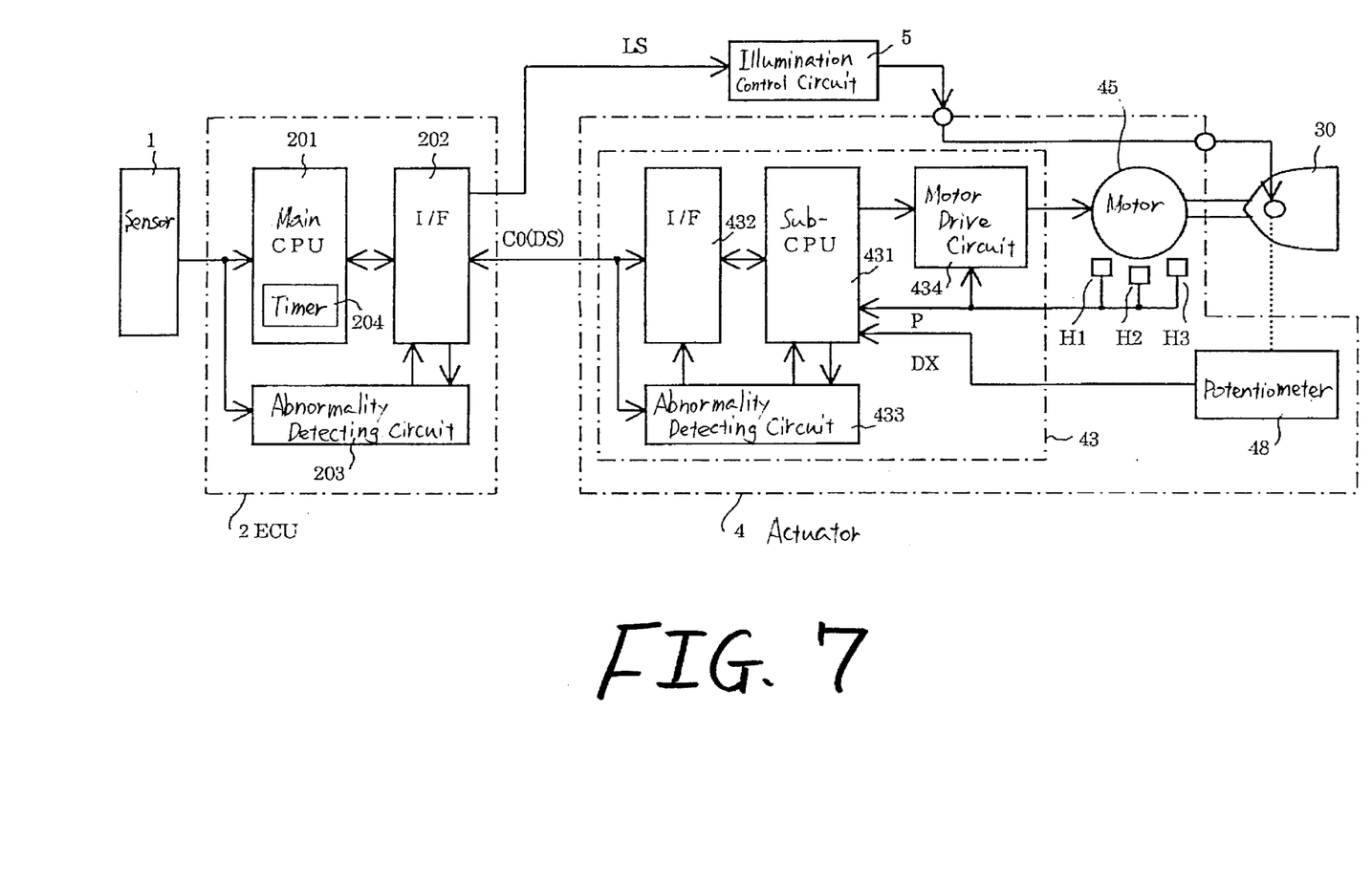
FIG. 7 is a block circuit diagram showing a circuit construction of the AFS.

FIG. 7 is a block circuit diagram showing the construction of the electric circuit of the ECU 2 and the actuator 4. The actuator 4 is mounted on the left and right swivel lamps 3L, 3R of the motor vehicle respectively, and being able to intercommunicate with the EUC 2. The aforementioned ECU 2 comprises a main CPU 201 for processing by a prescribed algorithm based on information from the aforementioned sensor 1 to output the required control signal CO, an interface circuit 202 for feeding and receiving the control signal CO between the main CPU 201 and the actuator 4 (hereinafter referred to as I/F), an abnormality detecting circuit 203 for observing the various signals in the ECU 2 including the main CPU 201 and supplying the abnormality-detected signal when abnormality is detected, and a timer 204 that starts timekeeping upon reception of a prescribed signal from the main CPU 201 and supplies the time-up signal to the main CPU 201 when a prescribed time period is elapsed. The sensor 1 includes a steering angle sensor for detecting the steering angle of the steering wheel and a vehicle speed sensor for detecting the vehicle speed, though they are not shown in the figure, and the outputs from the respective sensors are adapted to be fed to the ECU 2.

The controlling circuit 43 comprising electronic components contained in the actuators 4 provided respectively in the swivel lamps 30 provided in the left and right swivel type lights 3L, 3R of the motor vehicle comprises an I/F circuit 432 for feeding and receiving the signal to and from the ECU 2, a sub-CPU 431 for processing by a prescribed algorithm based on the signal entered form the I/F circuit 432, pulse signal P fed from the hall elements H1, H2, H3, and the deflection angle detected signal DX entered from the potentiometer 48, an abnormality detecting circuit 433 for observing signals supplied through the I/F circuit 432 and supplying an abnormality-detected signal to the sub-CPU 431 when such signals are determined to be abnormal, and a motor drive circuit 434 for driving and rotating the brushless motor 45. Here, the deflection angle signal DS of the swivel lamp 30 is supplied from the ECU 2 as a part of the controlling signal CO, and entered into the actuator 4. In the same manner, the illumination control signal LS for turning the swivel lamp 30 off is supplied from the ECU 2, and the supplied illumination control signal LS is entered into the illumination control circuit 5 provided separately from the actuator 4 for illuminating the swivel lamp 30.

Figure 8:
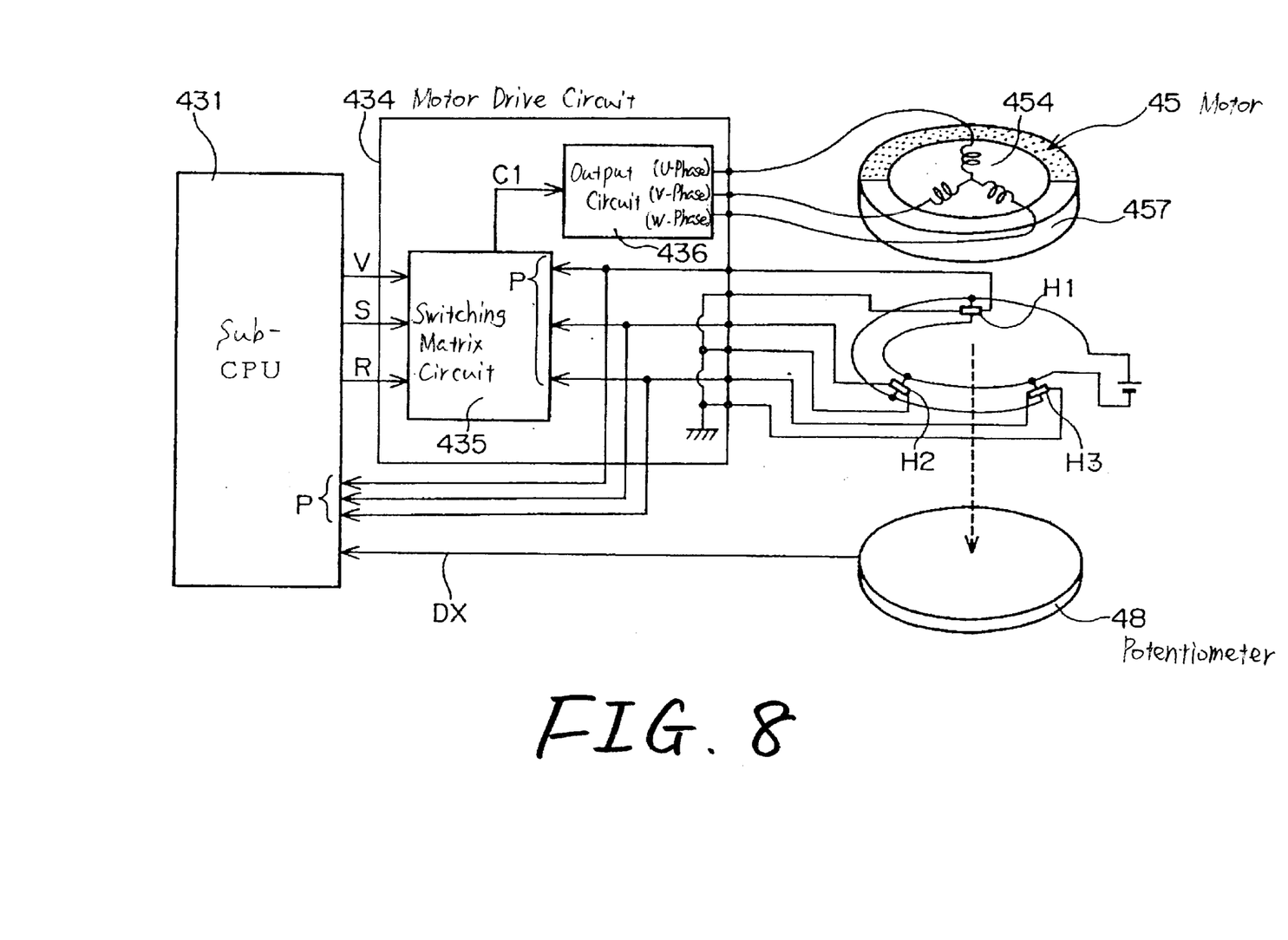
FIG. 8 is a circuit diagram showing a circuit construction of the actuator.

FIG. 8 is a circuit diagram showing a frame format of the motor drive circuit 434 and the brushless motor of the actuator 4. A switching matrix circuit 435 for receiving speed control signal V, start/stop signal S, normal/reverse rotation signal R respectively from the sub-CPU of the actuator 4 as control signal, and pulse signal from the three hall elements H1, H2, H3, and an output circuit 436 for adjusting the phase of electric power in three phases (U phase, V phase, and W phase) to be supplied to three pairs of coils in the stator coil 454 of the brushless motor 45 upon receipt of the output from the switching matrix circuit 435. In this motor drive circuit 434, supplying each electric power of U phase, V phase, and W phase to the stator coil 454 rotates the magnet rotor 457, and thus the rotor 455 and the revolving shaft 453 integrated therewith rotate. When the magnet rotor 457 rotates, each hall element H1, H2, H3 detects variations in magnetic field, and then supplies pulse signal P. The pulse signal P is entered into the switching matrix circuit 435, and the switching operation in the output circuit 436 is performed in exact timing with the pulse signal supplied into the switching matrix circuit 435, so that the rotation of the magnet rotor 457 continues. The switching matrix circuit 435 supplies a required control signal C1 to the output circuit 436 base on speed control signal V, start/stop signal S, and normal/reverse rotation signal R from the sub-CPU 431. The output circuit 436, upon receipt of the control signal C1, adjusts the phase of electric power in three phases to be supplied to the stator coil 454 to control the start and stop of the rotational motion, the direction of rotation, and speed of rotation of the brushless motor 45. The output from the potentiometer 48 provided in the actuator 4 is entered into the sub-CPU 431. The sub-CPU 431 receives a part of the pulse signal P supplied from each hall element H1, H2, H3, and recognizes the rotating state of the brushless motor 45.

According to the construction described above, as shown in FIG. 1, when information on the steering angle of the steering wheel SW of the motor vehicle, the speed of the motor vehicle, and other traveling state of the motor vehicle is supplied from the sensor 1 disposed in the motor vehicle into the ECU 2, the ECU 2 performs calculation in the main CPU 201 based on the supplied sensor outputs, calculates the deflection angle signal of the swivel lamp 30 of the swivel type lights 3L, 3R in the motor vehicle, and enters it into the respective actuators 4 of the swivel type lights 3L, 3R. Then, in the actuator 4, the sub-CPU 431 performs calculation based on the supplied deflection angle signal, calculates the signal corresponding to the deflection angle signal and supplies to the motor drive circuit 434, and drives and rotates the brushless motor 45. Since the rotational drive force of the brushless motor 45 is decelerated in the speed reducing gear mechanism 46 and transmitted to the revolving output shaft 44, the swivel reflector 31 connected to the revolving output shaft 44 rotates in the horizontal direction, and the direction of the optical axis of the swivel lamp 30 is varied. When the swivel reflector 31 makes a rotary motion, the rotary disc 483 of the potentiometer 48 is rotated with the rotation of the revolving output shaft 44, and thus the rotating angle of the revolving output shaft 44, or the deflecting angle of the swivel reflector 31 is detected based on variations in resistance value when the sliding contact point is slid on the surface of the resistance pattern on the fixed substrate 482 by a rotary motion of the rotary disc 483, and the deflection angle detected signal DX is entered into the sub-CPU 431. The sub-CPU 431 then compares the deflection angle detected signal DX with the deflection angle signal DS supplied form the ECU 2, and performs feedback control on the rotating angle of the brushless motor 45 to make them coincide with each other, so that the direction of the optical axis of the swivel reflector 31, or the direction of the optical axis of the swivel lamp 30 can be controlled to the angular position set by the deflection angle signal DS with high degree of accuracy.

With such deflecting motion of the swivel reflector 31, in both of the swivel type lights 3L, 3R, light directed in the straight ahead direction of the motor vehicle emitted from the fixed lamp 20 and deflected light emitted from the swivel lamp 30 are joined to illuminate the area including the left and right areas deflected from the straight ahead direction of the motor vehicle, so that not only the straight ahead direction of the motor vehicle, but also the front area in the steered directions can be illuminated during travel of the motor vehicle, thereby enabling enhancement of driving safety.

The abnormality detecting circuits 203, 433 detect the abnormality in AFS respectively and supply the abnormality-detected signal. The main CPU 201 and the sub CPU 431, upon receipt of the abnormality-detected signal, release the swivel lamp 30 from the aforementioned deflected state and force the optical axis of the swivel lamp 30 to be set to a prescribed reference position of deflection so that the traffic safety problem in that the optical axis of the swivel lamp 30 stays in the deflected state and cannot be adjusted due to abnormality of the AFS can be solved, which will not be described here.

Figure 9:
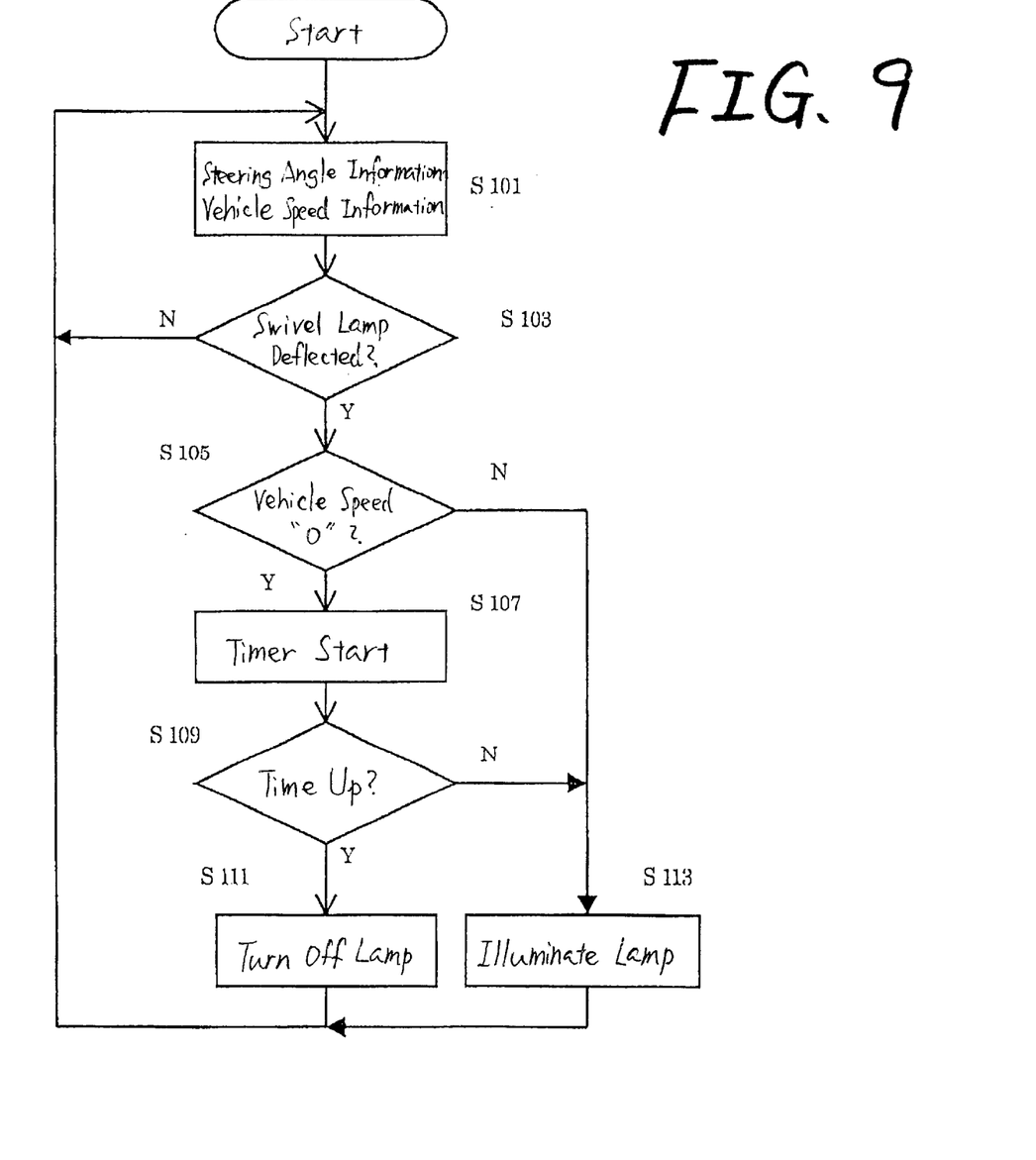
FIG. 9 is a flow chart showing the illumination control operation in the illumination control circuit.

On the other hand, when the vehicle is stopped or continuously in the halted state such as the state traveling at the speed of approximately 5 km/h in a state in which the swivel lamp 30 is deflected based on the output of the sensor 1 supplied as a result of detecting the steering state of the steering wheel SW, other cars or pedestrians may be dazzled, which is not favorable in terms of traffic safety. In order to prevent such a condition, when the vehicle is continuously in the halted state for a prescribed time period, the swivel lamp 30 is turned off to prevent dazzling of other cars or pedestrians. FIG. 9 is a flowchart showing such an operation, and FIG. 10 is a timing chart.

Figure 10:
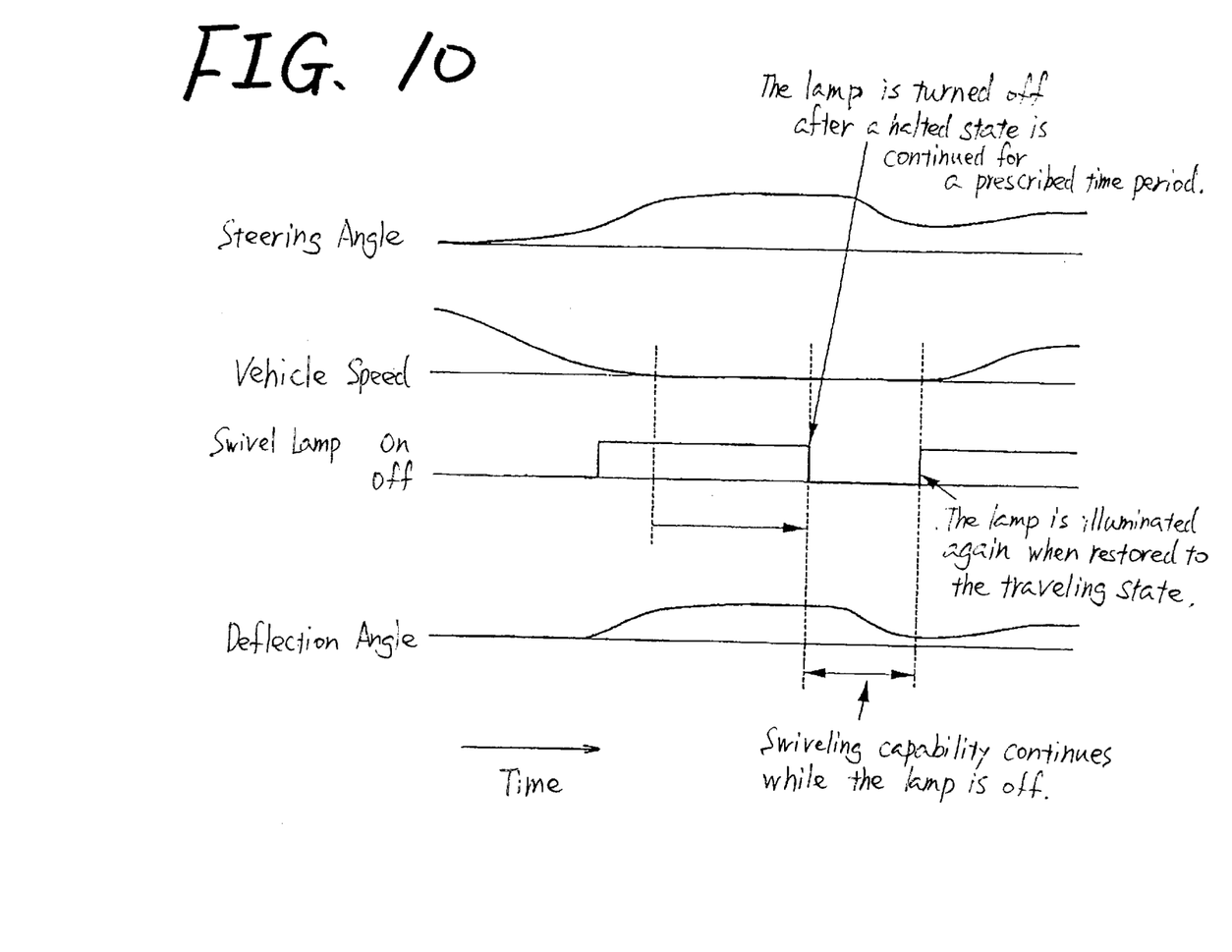
FIG. 10 is a timing chart of the illumination control operation.

As shown in FIG. 9 and FIG. 10, when the main CPU 201 that serves as a halting state detecting means for vehicles receives steering angle information from the sensor 1, that is, the steering angle sensor of the steering wheel SW, and vehicle speed information from the vehicle speed sensor of the vehicle (S101), it determines whether or not the swivel lamp 30 is deflected or not from steering angle information from the steering angle sensor (S103). When the swivel lamp 30 is in the deflected state, it determines whether the vehicle speed is "0" or not more than the prescribed speed (for example, 5 km/h), in other words, whether or not the motor vehicle is in the halted state, from speed information from the vehicle speed sensor (S105). When the vehicle is in the halted state, the timer 204 is activated and starts timekeeping (S107), and the predetermined certain time period is clocked (S109). When the prescribed time is elapsed, the lights-out signal is supplied as a illumination control signal LS. The lights-out signal is entered into the illumination control circuit 5, and the illumination control circuit 5 turns the swivel lamp 30 off (S111). In the case where the vehicle speed is not in the halted state of the vehicle in the step S105, and until the prescribed time period is elapsed in the step S107, the swivel lamp 30 is kept in the illuminated state (S113). Accordingly, even when the vehicle is stopped on the road shoulder along the sideway, the oncoming cars or the pedestrians are not dazzled, and the trailing car does not have a feeling of insecurity, thereby being effective to ensure traffic safety of the oncoming cars, pedestrians, and trailing car. On the other hand, even when the vehicle is in the halted state in the step S111, the swivel lamp 30 is kept in the illuminated state until a prescribed time period is elapsed, and thus the swivel lamp 30 is not turned off when the halted time period is short as in the case where the vehicle is halted at an intersection until the oncoming cars are discontinued before turning to the right, and thus traffic safety in this aspect is ensured. It is needless to say that when the vehicle is halted continuously for a long time, the swivel lamp 30 in the deflected state is turned off to advantageously save consumption of power of the vehicle-mounted power source.

On the other hand, when the vehicle came out of the halted state after the swivel lamp 30 is turned off in the step S111, that is, when the vehicle starts traveling and reaches the speed faster than the prescribed speed, the vehicle is not determined to be in the halted state in the step S105, and the main CPU 201 supplies the illumination signal as an illumination control signal LS. The illumination signal is entered into the illumination signal control circuit 5, and the illumination control circuit 5 brings the swivel lamp 30 into the illuminated state (S113). As shown in FIG. 10, while the vehicle is determined to be halted and the swivel lamp 30 is being turned off, the deflection angle signal DS from the ECU 2 is continuously supplied, and the deflecting operation of the swivel lamp 30 by the actuator 4 is being continued. Therefore, when the vehicle starts traveling again, the swivel lamp 30 starts illuminating at a favorable deflection angle, and thus traffic safety of the vehicle at the time of starting traveling is ensured.

In the aforementioned embodiment, when the swivel lamp 30 is not deflected, the swivel lamp 30 is not turned off because there is no possibility of dazzling other cars or pedestrians even when the vehicle is halted for more than the prescribed time period, but it is also possible to modify a part of the flow and construct in such a manner that the swivel lamp 30 is turned off when the halted state is longer than a prescribed time period even when the swivel lamp 30 is not deflected. In this case, consumption of power of the vehicle-mounted power source is advantageously reduced.

In the aforementioned embodiment, though the swivel lamp 30 is turned off when the halted state is continued, it may also be dimmed to the brightness that does not dazzle other cars or pedestrians. In order to perform such dimming operation, a pulse illumination circuit using a chopper circuit or a illumination circuit using a resistance must simply be integrated in the illumination control circuit 5. When the vehicle came out of the halted state, the light is brightened to the brightness before being dimmed.

Though the deflection angle and the illumination of the swivel lamp are controlled based on information from the steering angle sensor and the vehicle speed sensor in the aforementioned embodiment, it is also possible to construct the present invention based on information from other sensors as far as the same control as in the aforementioned embodiment can be made corresponding to the steering and the speed of the motor vehicle. For example, the deflection angle may be controlled by detecting the steering direction by means of a sensor for detecting illumination of the turn signal lamp, or the illumination may be controlled by detecting the vehicle speed by means of the accelerator sensor.

Though an example of the AFS using the headlamp comprising the fixed lamp and the swivel lamp integrated with each other is shown as a swivel type light in the aforementioned embodiment, such construction that the swivel lamp, being formed as a single independent light, is used as an auxiliary lamp and combined with the headlamp comprising a fixed lamp to construct a swivel type light is also employed.

As is described thus far, since the present invention is constructed in such a manner that the halted state of the vehicle is detected by the AFS, and the auxiliary lamp is turned off or dimmed when the halted state of the vehicle is continued for more than prescribed time period, oncoming cars and pedestrians are prevented from being dazzled by the auxiliary lamp during the halted state of the vehicle, and the trailing car may be prevented from having a sense of insecurity, and on the other hand, the auxiliary lamp is maintained in the illuminated state when the vehicle is halted only for a very short period of time, thereby ensuring the traffic security. The auxiliary lamp is constructed to start illuminating again or illuminate in the same brightness as that before being dimmed when the vehicle came out of the halted state, and to continue the deflecting operation of the auxiliary lamp while the vehicle is in the halted state, so that the auxiliary lamp is illuminated when the vehicle starts traveling at a prescribed speed and illuminating at a favorable deflection angle, thereby enabling enhancement of traffic safety by the auxiliary lamp.

What is claimed is:

1. A vehicle lighting apparatus comprising:
   lamp deflection angle controlling means for controlling a deflection angle of an auxiliary lamp attached to a main lamp and controlling the deflection angle of the auxiliary lamp corresponding to a traveling condition of a vehicle;
   vehicle halted state detecting means for detecting a halted state of the vehicle; and
   illumination controlling means for turning off or dimming said auxiliary lamp when the halted state of the vehicle is continued for more than a prescribed time period.

2. The vehicle lighting apparatus according to claim 1, wherein said illumination controlling means turns the auxiliary lamp on again at the brightness same as one of a brightness before the auxiliary lamp is turned off and a brightness before dimmed when the vehicle comes out of the halted state.

3. The vehicle lighting apparatus according to claim 1, wherein said lamp deflection angle controlling means continues a deflecting operation of the auxiliary lamp as long as the halted state of the vehicle is continued.

4. The vehicle lighting apparatus according to claim 2, wherein said lamp deflection angle controlling means continues a deflecting operation of the auxiliary lamp as long as the halted state of the vehicle is continued.

* * * * *